United States Patent
Bandaru et al.

(10) Patent No.: US 9,653,081 B2
(45) Date of Patent: *May 16, 2017

(54) DIGITAL MEDIA FRAME

(71) Applicant: Monument Peak Ventures, LLC, Plano, TX (US)

(72) Inventors: M. Krishna Bandaru, Sunnyvale, CA (US); Robert E. Siegel, Menlo Park, CA (US)

(73) Assignee: Monument Peak Ventures, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,254

(22) Filed: Aug. 10, 2015

(65) Prior Publication Data
US 2015/0348556 A1    Dec. 3, 2015

Related U.S. Application Data

(60) Continuation of application No. 13/347,752, filed on Jan. 11, 2012, now Pat. No. 9,135,276, which is a
(Continued)

(51) Int. Cl.
*G06F 13/00* (2006.01)
*G06F 15/00* (2006.01)
(Continued)

(52) U.S. Cl.
CPC ............ *G10L 17/22* (2013.01); *G06F 3/0484* (2013.01); *G06F 17/30265* (2013.01);
(Continued)

(58) Field of Classification Search
CPC .............................. H04L 29/06; G06F 3/0481
(Continued)

(56) References Cited

U.S. PATENT DOCUMENTS 4,651,225 A    3/1987  Yamada
5,144,557 A    9/1992  Wang et al.
(Continued)

FOREIGN PATENT DOCUMENTS

EP    0 773 685    12/1991
EP    0 471 639    2/1992
(Continued)

OTHER PUBLICATIONS

Berger A, "Privacy protection for public directory services," Computer Networks and ISDN Systems, vol. 30, Sep. 1998, pp. 16-18.
(Continued)

*Primary Examiner* — Kevin Nguyen
(74) *Attorney, Agent, or Firm* — Ascenda Law Group, PC

(57) ABSTRACT

A method and a device for displaying images on a digital media frame is disclosed. In one embodiment, the device includes a memory, a processing unit, a display, an interface circuit, and a display circuit. The interface circuit has at least one receiving port capable of identifying various types of networking protocols that are used to transfer the image data. The processing unit attaches auxiliary information to each image before images are stored in a memory. The display circuit displays images according to the image data received. The digital media frame further contains a user input device, which allows a user to alter the image display sequence. The user input device is an input device other than a keyboard or a cursor control device.

20 Claims, 13 Drawing Sheets

Related U.S. Application Data division of application No. 11/183,210, filed on Jul. 15, 2005, now Pat. No. 8,984,419, which is a continuation of application No. 09/981,220, filed on Oct. 16, 2001, now Pat. No. 7,155,679, which is a continuation of application No. 09/405,523, filed on Sep. 23, 1999, now abandoned, which is a continuation-in-part of application No. 09/195,355, filed on Nov. 18, 1998, now abandoned.

(51) Int. Cl.

| | | |
|---|---|---|
| *G10L 17/22* | (2013.01) | |
| *G06F 3/0484* | (2013.01) | |
| *G06F 17/30* | (2006.01) | |
| *H04N 1/00* | (2006.01) | |
| *H04N 5/77* | (2006.01) | |
| *H04N 9/64* | (2006.01) | |
| *G09G 5/00* | (2006.01) | |
| *H04N 1/32* | (2006.01) | |

(52) U.S. Cl.
CPC ... *G06F 17/30274* (2013.01); *H04N 1/00198* (2013.01); *H04N 1/00244* (2013.01); *H04N 1/00347* (2013.01); *H04N 5/77* (2013.01); *H04N 9/641* (2013.01); *G09G 5/003* (2013.01); *G09G 2380/16* (2013.01); *H04N 1/00204* (2013.01); *H04N 1/32128* (2013.01); *H04N 2201/0027* (2013.01); *H04N 2201/0084* (2013.01); *H04N 2201/0087* (2013.01); *H04N 2201/0089* (2013.01); *H04N 2201/3266* (2013.01); *H04N 2201/3273* (2013.01)

(58) Field of Classification Search
USPC .................. 715/752–753, 760, 740, 780
See application file for complete search history.

(56) References Cited

U.S. PATENT DOCUMENTS

| | | | |
|---|---|---|---|
| 5,270,831 | A | 12/1993 | Parulski et al. |
| 5,410,415 | A | 4/1995 | Parulski et al. |
| 5,414,457 | A | 5/1995 | Kadowaki et al. |
| 5,414,811 | A | 5/1995 | Parulski et al. |
| 5,448,372 | A | 9/1995 | Axman et al. |
| 5,633,726 | A | 5/1997 | Timmermans |
| 5,636,316 | A | 6/1997 | Oku et al. |
| 5,682,326 | A | 10/1997 | Klingler et al. |
| 5,689,638 | A | 11/1997 | Sadovsky |
| 5,706,290 | A | 1/1998 | Shaw et al. |
| 5,708,845 | A | 1/1998 | Wistendahl et al. |
| 5,760,917 | A | 6/1998 | Sheridan |
| 5,908,142 | A | 6/1999 | Sacchetti |
| 5,930,471 | A | 7/1999 | Milewski et al. |
| 5,945,989 | A | 8/1999 | Freishtat et al. |
| 5,966,122 | A | 10/1999 | Itoh |
| 5,973,682 | A | 10/1999 | Saib et al. |
| 5,982,364 | A | 11/1999 | Beckwith |
| 5,987,504 | A | 11/1999 | Toga |
| 6,006,039 | A | 12/1999 | Steinberg et al. |
| 6,017,157 | A | 1/2000 | Garfinkle et al. |
| 6,026,430 | A | 2/2000 | Butman et al. |
| 6,028,603 | A | 2/2000 | Wang et al. |
| 6,035,323 | A | 3/2000 | Narayen et al. |
| 6,044,403 | A * | 3/2000 | Gerszberg ............... H04L 29/06 709/217 |
| 6,047,310 | A | 4/2000 | Kamakura et al. |
| 6,064,666 | A | 5/2000 | Willner et al. |
| 6,121,970 | A | 9/2000 | Guedalia |
| 6,141,010 | A | 10/2000 | Hoyle |
| 6,141,482 | A | 10/2000 | Massarksy |
| 6,151,624 | A | 11/2000 | Teare et al. |
| 6,166,729 | A | 12/2000 | Acosta et al. |
| 6,266,069 | B1 | 7/2001 | Thagard et al. |
| 6,442,573 | B1 | 8/2002 | Schiller et al. |
| 6,509,910 | B1 | 1/2003 | Agarwal et al. |
| 6,519,584 | B1 * | 2/2003 | Tognazzini ............ G06F 3/0481 705/14.4 |
| 6,877,031 | B2 | 4/2005 | Watanabe et al. |
| 2001/0042098 | A1 | 11/2001 | Gupta et al. |
| 2003/0051255 | A1 | 3/2003 | Bulman et al. |
| 2003/0074672 | A1 | 4/2003 | Daniels |
| 2004/0250083 | A1 | 12/2004 | Schwab |
| 2005/0088693 | A1 | 4/2005 | Schnoebelen et al. |

FOREIGN PATENT DOCUMENTS

| | | |
|---|---|---|
| EP | 0 717 339 | 6/1996 |
| EP | 0 766 431 | 4/1997 |
| EP | 0 818 916 | 1/1998 |
| EP | 0 737 978 | 1/2002 |
| JP | 10-011397 | 1/1998 |
| JP | 11-260045 | 9/1999 |
| WO | WO-97/49251 | 12/1997 |
| WO | WO-98/43184 | 10/1998 |
| WO | WO-99/39275 | 8/1999 |
| WO | WO-00/16541 | 3/2000 |
| WO | WO-00/29960 | 5/2000 |

OTHER PUBLICATIONS

Communication on EP Application 01955905.3, dated Jun. 1, 2007.
Final Office Action on U.S. Appl. No. 11/183,210, mailed Aug. 14, 2014.
Final Office Action on U.S. Appl. No. 13/347,752, mailed Feb. 24, 2015.
Final Rejection on U.S. Appl. No. 09/981,220, mailed Mar. 14, 2005.
Final Rejection on U.S. Appl. No. 11/183,210, mailed Jan. 13, 2011.
Final Rejection on U.S. Appl. No. 11/183,210, mailed Nov. 24, 2009.
International Search Report for PCT/US00/26108, mailed Dec. 5, 2000.
International Search Report for PCT/US01/23056, mailed May 31, 2002.
International Search Report on PCT/US01/23068, mailed Jan. 31, 2002.
Non-Final Office Action on U.S. Appl. No. 09/981,220, mailed Jan. 19, 2006.
Non-Final Office Action on U.S. Appl. No. 09/981,220, mailed Jul. 30, 2004.
Non-Final Office Action on U.S. Appl. No. 09/981,220, mailed Aug. 11, 2005.
Non-Final Office Action on U.S. Appl. No. 11/183,210, mailed Feb. 24, 2014.
Non-Final Office Action on U.S. Appl. No. 11/183,210, mailed May 22, 2009.
Non-Final Office Action on U.S. Appl. No. 11/183,210, mailed May 25, 2010.
Non-Final Office Action on U.S. Appl. No. 13/347,752, mailed Sep. 15, 2014.
Notice of Allowance on U.S. Appl. No. 11/183,210, mailed Oct. 29, 2014.
Notice of Allowance on U.S. Appl. No. 11/183,210, mailed Nov. 28, 2011.
Notice of Allowance on U.S. Appl. No. 13/347,752, mailed May 6, 2015.
Notice of Allowance on U.S. Appl. No. 09/981,220, mailed Aug. 11, 2006.
Official Action on Japanese Application 2013-006201, mailed Dec. 3, 2013 (English translation not available).

* cited by examiner

DIGITAL MEDIA FRAME

CROSS-REFERENCE TO RELATED APPLICATIONS

This is a continuation application of U.S. Ser. No. 13/347,752, filed Jan. 11, 2012, which is a divisional application of U.S. Ser. No. 11/183,210 filed Jul. 15, 2005 (now U.S. Pat. No. 8,984,419), which is a continuation application of U.S. Ser. No. 09/981,220 filed Oct. 16, 2001 (now U.S. Pat. No. 7,155,679), which is a continuation application U.S. Ser. No. 09/405,523, filed Sep. 23, 1999, which is a continuation-in-part application Ser. No. 09/195,355, filed on Nov. 18, 1998.

FIELD OF THE INVENTION

The present invention relates generally to the field of electronic pictorial representation, more specifically, the present invention relates to digital image processing.

BACKGROUND OF THE INVENTION

With image representations evolving rapidly into a viable consumer electronic business, digital photography and digital images are emerging to fill the needs of image representation. Images are commonly captured by digital cameras or digital scanners. A typical digital camera captures a picture and stores the captured pictorial information in a digital data format. Also, a conventional digital scanner scans pictures, such as, a color photographic film (e.g., 35 mm), and converts the scanned pictorial information into digital image data.

Once an image is captured and the captured image data is generated, it is often difficult to display the captured image. One conventional approach is to use a personal computer ("PC") to display the images. In this approach, the image data is first transferred to the PC from an image capturing device, such as, a digital camera, and then the PC displays the image according to the image data received. A problem with this approach is that a regular PC may not be able to process the image data without additional software or hardware to reconfigure the PC. Moreover, a PC is usually not portable. Even though a laptop PC is portable, the laptop PC is inadequate for use as a picture frame because not only does the laptop PC have to be reconfigured so that it is capable of processing the image data, but it is also too expensive to use a laptop PC as a picture frame.

Another commonly employed approach is to use an image-processing machine, such as, a workstation, a mini-computer, or a mainframe. Like the PC, the image data must first be transferred to the image-processing machine, and the image-processing machine, subsequently, displays the image after processing the image data. This approach posts similar problems as a PC that the image-processing machine has to be reconfigured before it is able to process the image data. Also, the image-processing machine is not typically mobile.

Accordingly, it is desirable to have an inexpensive digital media frame that is capable of obtaining images with or without a PC and capable of displaying images in places where a PC cannot go. As will be seen, one embodiment of the present invention provides a portable digital media frame that displays images.

SUMMARY OF THE INVENTION

A method for providing digital images and/or information over a communication network to a digital media frame, comprising the steps of:

(a) providing a network service over said communication network;

(b) permitting a digital media frame to access a communication network, said digital media frame having two or more display portions for displaying independent text and/or graphics;

(c) allowing a user of said digital media frame to select the receiving of customized information transmitted over said communication network with respect to at least one of said display portions;

(d) transmitting the customized information from the network service to the digital media frame; and (e) automatically displaying the customized information on the digital media frame when the digital media frame is in the operating state.

In another embodiment of the invention there is provided a method for providing digital images and/or information over a communication network to a digital media frame, comprising the steps of:

(a) providing a network service over said communication network;

(b) permitting a digital media frame to access a communication network, said digital media frame having two or more display portions for displaying independent text and/or graphics;

(c) allowing a user of said digital media frame to select the receiving of customized information transmitted over said communication network with respect to at least one of said display portions;

(d) transmitting the customized information from the network service to the digital media frame; and (e) automatically displaying the customized information on the digital media frame when the digital media frame is in the operating state.

In yet another embodiment of the invention there is provided a method for providing digital images over a communication network comprising the steps of:

(a) providing a network service over the communication network;

(b) permitting a digital media frame to access a network server via the communication network service;

(c) allowing a user of said digital media frame to select a customized information transmission from the network service;

(d) transmitting the customized news transmission from the network service to the digital media frame; and (e) automatically displaying the customized news transmission on the digital media frame when the device is the operating state.

BRIEF DESCRIPTION OF THE DRAWINGS

The present invention is illustrated by way of example and not limitation in the accompanying figures.

DETAILED DESCRIPTION OF THE INVENTION

A digital media frame ("DMF") and method for displaying digital pictures is disclosed. In the following description numerous specific details are set forth in order to provide a thorough understanding of the present invention. It will be apparent, however, to one having ordinary skill in the art that the specific detail need not be employed to practice the present invention. In other instances, well known materials or methods have not been described in detail in order to avoid obscuring the present invention and minimal display hardware.

The DMF allows a user to display at least one digital image with minimal user intervention. The image is referred to as a photographic image or picture, a graphic image, a text image, a data image, or any other type of displayable information. The DMF is capable of receiving image data from various external input devices, such as, digital cameras, video cameras, computers, telephone lines, television cables, and Internet servers or other types of networks. Upon receipt of the image data, the DMF generates auxiliary information relating to each image and stores the image together with the auxiliary information in the memory. The DMF, subsequently, fetches the image data from the memory with the auxiliary information and displays the images on a display.

Figure 1:
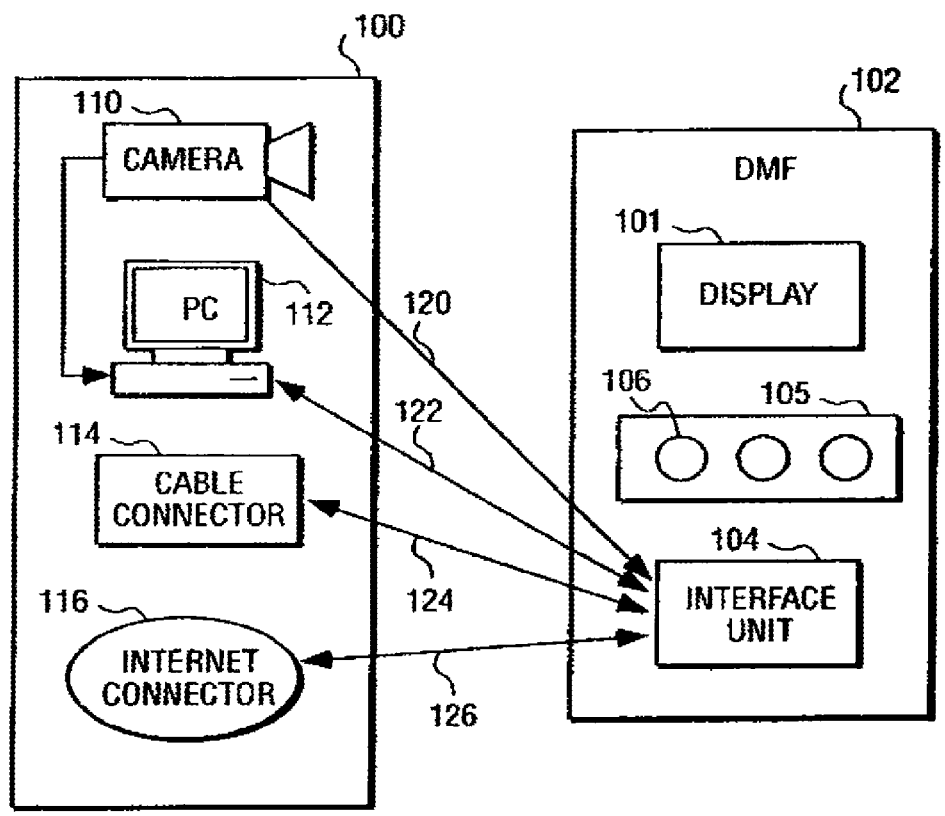
FIG. 1 illustrates a connection between Digital Media Frame ("DMF") and external input devices in accordance with an embodiment of the present invention.

FIG. 1 illustrates an embodiment of a connection between DMF and external input devices 100. The connection includes a DMF 102, a camera 110, a personal computer ("PC") 112, a cable connector 114, and an Internet connector 116. The DMF 102 further contains an interface unit 104 and a user input component 105. The user input component 105 also contains user-input buttons 106, which are the input devices. The interface unit 104 includes at least one I/O ("input and output") port capable of connecting to the camera 110, PC 112, the cable connectors 114, and the Internet connector 116 using connecting cables 120, 122, 124, and 126, respectively. The interface unit 104 is further capable of receiving and processing both digital and analog image data. It will be apparent to one of ordinary skill in the art that one or more of these external input devices may be connected to a particular DMF 102. It will also be apparent that the equivalent conventional input devices may be similarly connected. The digital camera may be a digital still camera or a digital video camera, and the video camera may be an analog video camera.

The camera 110 can either be a digital or a video camera. In one embodiment, the camera 110 can directly transfer the captured image to the DMF using conventional transmission media, such as, for example, wireless, cable, or removable media. In another embodiment, the camera 110 can first transfer the captured images to a computer 112 and the computer 112, subsequently, transfers the image data to the DMF 102. The advantage of using a computer 112 as a forwarding station between the camera 110 and the DMF 102 is to perform some functions where the DMF 102 is unable to perform, such as data conversion.

The computer 112, which may be a PC, a workstation, a mini-computer, or a mainframe computer, or a processor based system, receives image data from other devices, such as, scanners, Internet servers, or cameras 110. Upon receipt of image data, the computer 112 may perform some functions before the computer 112 passes the image data to the DMF 102. The function may involve reordering the sequence of the images to be displayed, or converting one type of image data format to another type of image data format, and so on.

The cable connectors 114 include television and telephone lines. The lines could be optical, metal, or cordless media. In one embodiment, the interface unit 104 is capable of receiving the image data directly from the cable connectors 114. In another embodiment, the interface unit 104 receives the image data from a forwarding station, such as a computer 112, where the cable 114 is connected to the computer 112.

The Internet connector 116 is another external input device 100 that enables the DMF 102 to receive the image data directly from an Internet node. In one embodiment, the DMF 102 is configured to be able to read ("HyperText Markup Language") HTML and to interface with Transmission Control Protocol ("TCP")/Internet protocol ("IP"). It should be noted that the connecting cables, 120, 122, 124, and 126 can use conventional optical, electrical, or wireless data communication technology.

Figure 2:
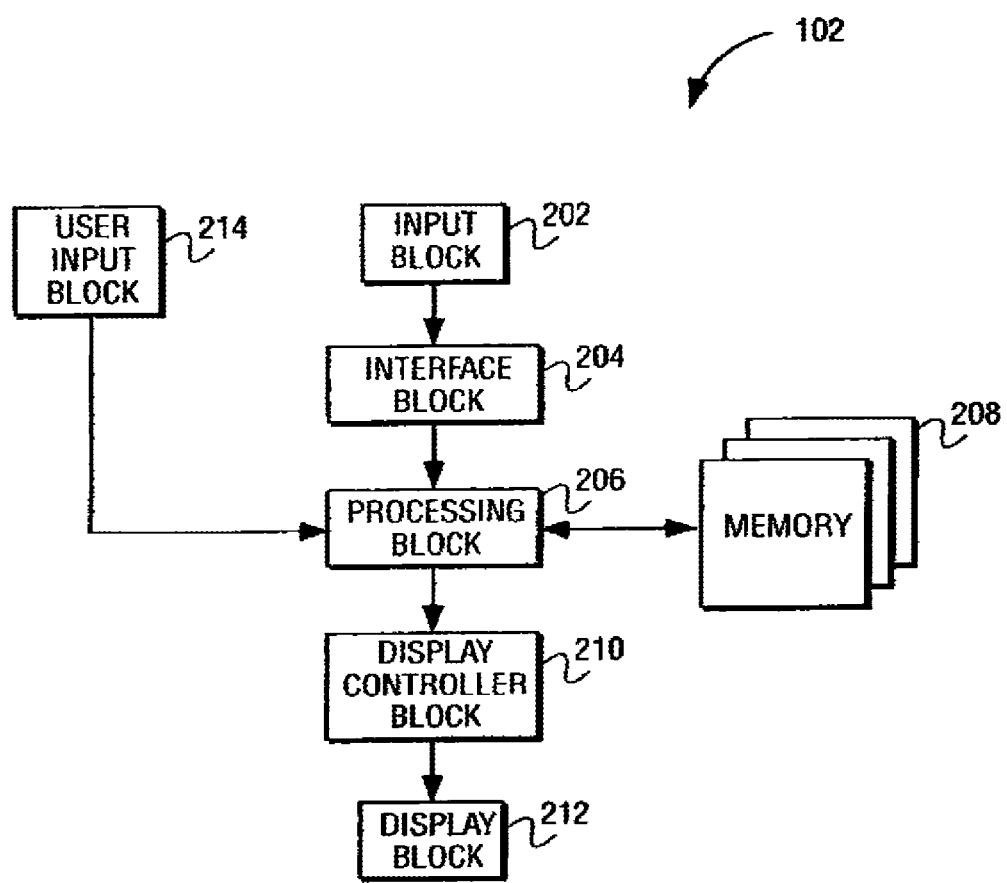
FIG. 2 illustrates a block diagram of DMF in accordance with an embodiment of the present invention.

FIG. 2 illustrates a block diagram of DMF 102. Block 202 represents external input devices 100, which include digital and video cameras, scanners, computers, and Internet servers. Digital and video cameras include digital video cameras, digital still cameras, analog video cameras, and so on. Upon capturing image data, the external input devices transfer captured image data to the interface block 204. Block 204 represents an interface unit of the DMF 102, where the interface unit 104 receives the image data from block 202. After receiving the image data, the interface unit identifies the type of protocol or data format being used to transfer the image data and further determines whether a conversion may be required. A conversion to a native DMF data format is needed if the DMF is unable to identify and to process originally received data format for image data. Once the image data format is properly identified, the image data is passed from block 204 to block 206 for processing.

Block 206 represents processor(s) or micro-controller(s), which is a processing unit for the DMF 102. Block 206 determines where the image data is to be stored and which sequence of the images is to be displayed. Block 206 also generates auxiliary information for each image, where the auxiliary information includes a color assignment, date and time of the image data created and received, Internet address, audio information, image orientations, and so on. The color assignment maps out image color distribution from an available color grid according to the color distribution of the image data. The date and time of the image data created and received indicates the date and time that each image was created and the date and time that the image was received by the DMF 102. The Internet address indicates which Internet node was used for sending the image data to the DMF 102. In one embodiment, the Internet address links to other web sites that are related to the image. For example, if an image describes a child, the linked web sites describe child's family. Audio information includes both the original sound that came with the image data and edited sound created by users. Moreover, block 206 also receives control signals from block 214.

Block 214 represents a user-input unit. In one embodiment, block 214 gives a user certain controls to manage how images should be displayed. Block 214 can be any conventional input device, such as, a push button, a screen input device, remote control input device, or a sound activated input device (including speech recognition input-output device). The output(s) of block 214, which is a control signal from a user to indicate how images should be displayed, is fed onto block 206, where block 206 uses the output(s) of block 214 as an input(s) for determining how to display images. Block 206 also receives inputs from block 208.

Block 208 represents a memory block, (or set of memory blocks) which may include, for example, one or more of the following: dynamic random access memory ("DRAM"), static random access memory ("SRAM"), read-only memory, ("ROM"), non-volatile memory, magnetic disk storage, magnetic tape storage, CD-ROM, DVD-ROM, and so on. In one embodiment, block 206 controls the access of block 208. It should be noted that block 208 may also receive data from other blocks, such as block 204 and block 210.

After block 206, the image data is transferred from block 206 to block 210, where the image data is prepared for displaying. Block 210 represents display controller. In one embodiment, block 210 is capable of controlling various types of display devices, such as, a liquid crystal display ("LCD"), a cathode-ray tube ("CRT"), or a silicon-based display. Block 210 processes the image data by converting the image data display codes to a format compatible with particular display hardware. Block 210 may also contain a memory to store the display codes. After conversion, block 210 transfers the display codes along with display controls to block 212.

Block 212 represents a display device, which may be a LCD, a CRT, a silicon-based display, or an image projector. After receipt of the display codes, block 212 displays images. It should be noted that blocks 210 and 212 can receive input signals from other blocks, such as block 214 could have direct input signals to block 210.

Moreover, there is a power block (not shown in the figure) that includes both AC and DC power supplies. In one embodiment, the DC battery backup power supply is employed for preventing memory loss upon AC power supply disconnection.

Figure 3:
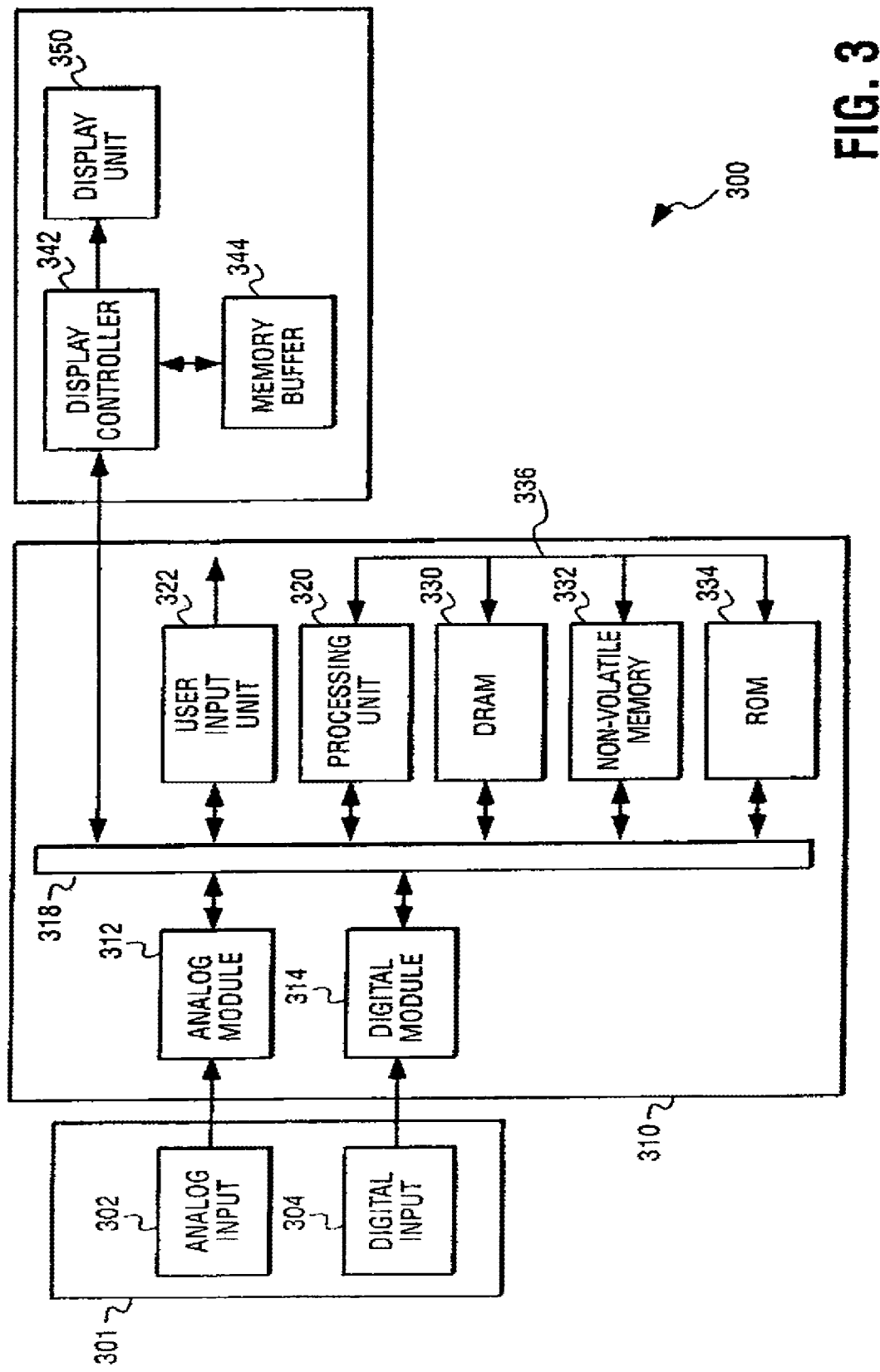
FIG. 3 illustrates a block diagram of DMF in accordance with an embodiment of the present invention.

FIG. 3 illustrates an embodiment of DMF architecture 300, which includes an image input block 301, image processing block 310, and image displaying block 340. The image-input block 301 captures images and transfers the captured image data to the image-processing block 310. The image-processing block 310 identifies types of image data and stores the identified image data. The image-processing block 310 further attaches auxiliary information to each image and then transfers the image data to the image-displaying block 340. The image displaying block 340 displays images according to the image data received.

The image-input block 301 contains an analog input unit 302 and a digital input unit 304. The analog input unit 302 is an analog input device, such as a video camera, and is capable of generating analog image data according to captured images. Upon generation of the analog image data, the analog input unit 302 transfers the analog image data to the image-processing block 310. The digital input unit 304 is a digital input device, such as a digital camera, and is capable of generating digital image data according to captured analog images. After properly generating the digital image data, the digital input unit 304 transfers the digital image data to the image-processing block 310.

The image processing block 310 contains an analog module 312, a digital module 314, a processing block 320, a user input unit 322, a dynamic random access memory ("DRAM") 330, an non-volatile memory unit 332, a read only memory ("ROM") 334, and an internal bus 318. The analog module 312 includes an analog receiver circuit and a synchronizing circuit. The analog receiver circuit receives analog image data from the image-input block 301. After receiving the analog image data, the synchronizing circuit performs analog to digital conversion and subsequently synchronizes the converted image data to generate image data. After the data is received and synchronized, the analog module 312 drives the digital image data on the internal bus 318.

In one embodiment, the digital module 314 includes a digital receiver circuit and a translation circuit (not shown in the figure). In one embodiment, the digital receiver circuit may include a universal serial bus ("USB") port for receiving digital image data from the image-input block 301. Upon receipt of the digital image data, the translation circuit determines whether a translation of the image data is needed. A translation is required if the data format of the input image data is a foreign data format. The foreign data format is a type of data format or protocol that the DMF is unable to implement. In one embodiment, the DMF has multiple native data formats, and is also capable of recognizing multiple foreign data formats. Consequently, the foreign data format of the image data must be converted to a native data format before the image data can be implemented for display. After the image data is properly received and translated, the digital module 314 drives the digital image data on the internal bus 318.

The internal bus 318 connects to the processing unit 320, DRAM 330, non-volatile memory 332, ROM 334, the analog module 312, and the digital module 314. In one embodiment, the processing unit 320 is used to control the internal bus 318, such as issuing bus busy and bus grant signals. It should be noted that other types of bus connections and bus controls are possible.

The processing unit 320, in one embodiment, connects to the internal bus 318, the user input unit 322, DRAM 330, non-volatile memory 332, and ROM 334. The processing unit 320 performs functions including image size scaling, color space conversion, image filtering, image decoding, image data compression/decompression, and so on. In another embodiment, a processor in the processing unit 320 is configured to determine a sequence of images to be displayed. The processor also controls variable time interval or time transition types between images. The interval transition time indicates the time interval between the current image and the next image to be displayed. The image transition is a mechanism of retiring current image while phasing in the next image. In one embodiment, the image transition moves current and next images in one direction as the current image move out while the next image moves.

In another embodiment, the processing unit 320 maps out image colors from available color grid according to color attributions of the image data. The processing unit 320 further generates auxiliary information for each image, where the auxiliary information may contains a color assignment, date and time of the image data generated and received, Internet addresses, audio information, image orientations, and so on.

In yet another embodiment, the processing unit 320 is capable of receiving a predetermined sequence of images to be displayed from an external input device 100, such as a computer. Moreover, a sequence of images to be displayed may be altered by control signals from a user, such as a pause signal from the user-input unit 322. The processing unit 320 further manages a low power management circuit to conserve power consumption upon disconnection of AC power supply.

The processing unit 320 is further configured to control the memory access. The memory devices includes DRAM 330, non-volatile memory 332, ROM 334, magnetic disk storage, magnetic tape storage, and so on. In one embodiment, the non-volatile memory 332 is a flash memory and is used to prevent memory loss upon disconnection of power supplies. The processing unit 320 controls the memory access using control bus 336, which carries various control signals. In another embodiment, the processing unit 320 controls the memory access using the internal bus 318 for issuing control signals, such as bus grant and bus busy signals.

In one embodiment, the sequence of the images to be displayed is a function of where the image data is to be stored in the memory. In this embodiment, the image display block 340 fetches the next image data from a predefined physical memory location. In another embodiment, a sequence of the images to be displayed can be reordered by the processing unit 320. In yet another embodiment, the sequence can be further altered by a user using the user-input unit 322.

In one embodiment, the processing unit 320 controls the internal bus 318 and the control bus 336. While the control bus 336 is used for control signals, the internal bus 318 is used for data. It should be noted that the internal bus 318 and the control bus 336 can be merged into one single bus. In another embodiment, the internal bus 318 contains a bus controller to control the bus access.

The user input unit 322 is an input device, such as a push button switch, a touch screen input device, remote control device, or a sound activated input device (speech recognition input-output device), and so on. In one embodiment, the user-input unit 322 provides display controls to users, such as a fast forward, a reverse, and pause functions. The fast forward function allows a user to view the next image, while the reverse function allows a user to view the previous image.

When the image data is properly identified and ordered, the processing unit 320 drives the image data together with the auxiliary information on the internal bus 318. In one embodiment, the processing unit 320 uses a private bus (not shown in the figure) between the processing unit 320 and the display controller 342 for transferring the image data. Upon receipt of the image data, the image display block 340 prepares to display the images in response to the image data and the auxiliary information.

The image display block 340 contains a display unit 350, a display controller 342, and a memory buffer 344. In one embodiment, the display unit 350 is a LCD. In another embodiment, the display unit 350 is a CRT. In yet another embodiment, the display unit 350 is a silicon-based display. After receiving the image data, the display controller 342 generates the image display code in response to the image data and the auxiliary information. The display unit 350, subsequently, receives display codes for images from the display controller 342 and displays the image. In one embodiment, the display controller 342 stores a set of display code in the memory buffer 344. In another embodiment, the display controller 342 stores the display code in the non-volatile memory 332 or DRAM 330.

It should be noted that the display controller 342 could be integrated into the display unit 350 or be integrated into the processing unit 320. Also, the image processing block 310 and image display block 340 may be integrated in a single integrated circuit ("IC").

Figure 4:
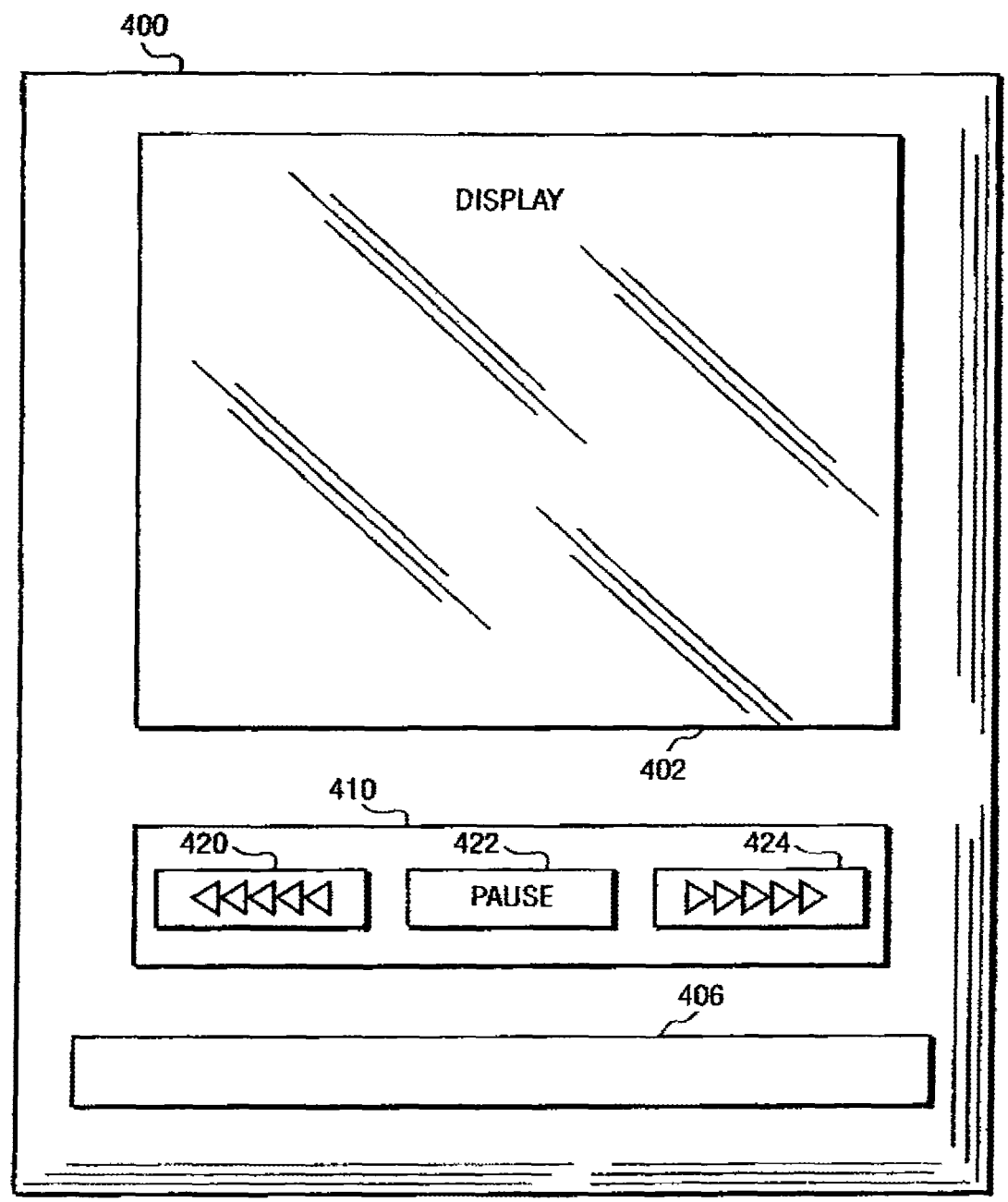
FIG. 4 illustrates a DMF having a display, a processing unit, and a user input device in accordance with an embodiment of the present invention.

Referring to FIG. 4, an embodiment of the DMF 400 is illustrated. The DMF 400 contains a display 402, a user input device 410, and a processing unit 406. The display 402 displays images according to the image data received. The processing unit 406 performs image-processing functions as described in above. The user-input device 410 is an input device that allows a user to change images that are currently displaying.

The user-input device 410 contains a reverse button 420, a pause button 422, and a fast forward button 424. The reverse button 420 allows a user to view previously displayed images, while the fast forward button 424 allows a user to view next sequential images. The pause button 422 causes a currently displaying image to freeze until a release command is issued by a subsequent activation of the pause button 422. In another embodiment, the user-input device 410 may be merged with the display 402, where inputs can be made through a conventional touch screen input device. In yet another embodiment, the inputs can be made through a conventional voice activated input device, such as a speech recognition input/output device. In yet another embodiment, the inputs come from a computer using conventional port connections.

Figure 5:
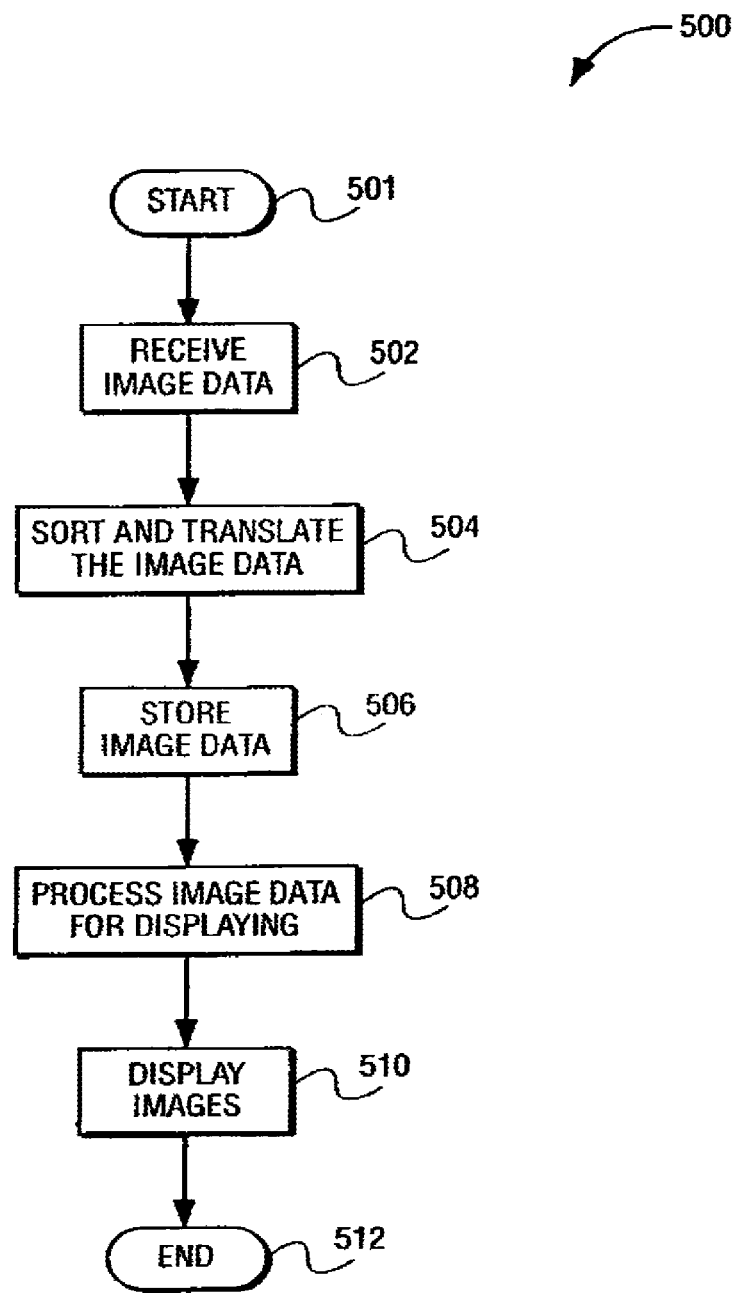
FIG. 5 is a flow chart illustrating a data flow of DMF in accordance with an embodiment of the present invention.

FIG. 5 is a flow chart illustrating a data flow within the DMF 400. A process of image displaying starts at block 501. The process proceeds to block 502, where an interface unit of the DMF 400 receives the image data. The image data may be captured by image capturing devices, such as a digital or video camera. Upon receipt of the image data, the interface unit 301 identifies whether the image data is in a digital data format or in an analog data format. If the image data is in the analog data format, the interface unit will convert the analog data format to a digital data format. If the image data is in the digital data format, no conversion from analog to digital ("A/D") is needed.

After block 502, the process proceeds to block 504, where the image data is sorted in a predefined sequence or a special ordered sequence of images. Before moving on to the next block, the process determines whether a translation is required. A translation is needed if the DMF 400 identifies that the data format of the image data is a foreign data format. Consequently, the foreign data format must be translated into a DMF native data format before the image data can be further processed. After the image data is properly sorted and translated, the process proceeds to the next block.

The process moves from block 504 to block 506, where the image data is stored in the memory. In one embodiment, the location of the image data stored determines the sequence of the images to be displayed. After block 506, the process proceeds to block 508, where the image data is converted to display codes. In one embodiment, block 508 determines the interval transition time and the various types of image transitions. The interval transition time indicates the time interval between the current image and the next image to be displayed. The image transition is a mechanism of retiring current images from the display while phasing in the next image. In one embodiment, the image transition moves current and next images in one direction as the current image moves out while the next image moves in. In another embodiment, the image transition fades out the current image while fading in the next image. After block 508, the process proceeds to block 510, where images are displayed according the image data together with the auxiliary information. The process ends at block 512.

Figure 6:
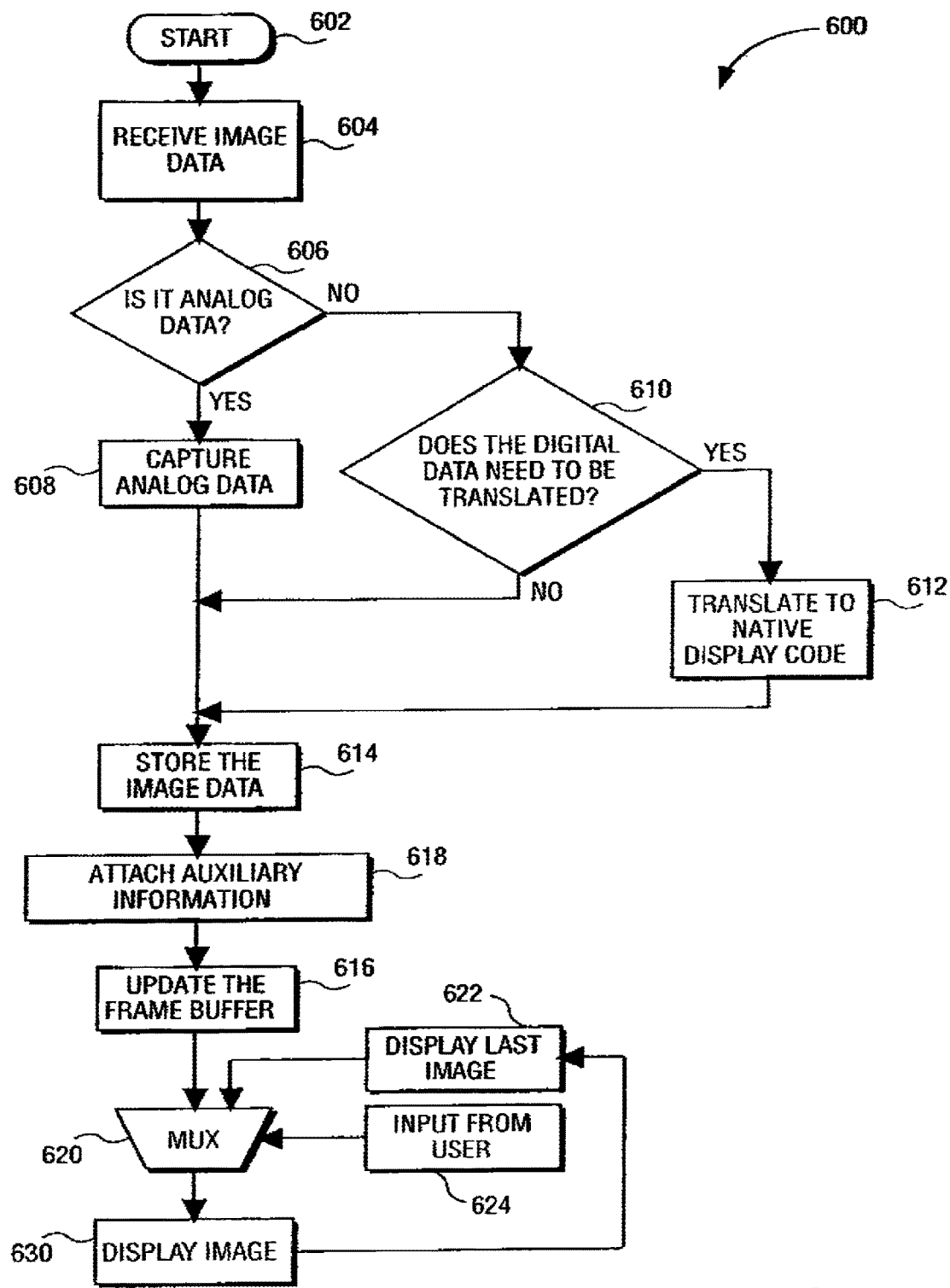
FIG. 6 is a flow chart illustrating a data control of DMF in accordance with an embodiment of the present invention.

FIG. 6 is a flow chart illustrating an embodiment of a controlled data flow of DMF 600. A process of image display starts at block 602. The process moves from block 602 to block 604, where an interface unit of the DMF receives the image data, which may be captured by image capturing devices, such as digital or video cameras. Upon receipt of the image data, the process proceeds to block 606, where the process identifies whether the image data is in analog or digital data format. If the image data is in analog data format, the process proceeds from block 606 to block 608. At block 608, the process converts the analog data format into digital data format. After conversion, the process proceeds from the block 608 to block 614, where the image data is stored.

If the image data is not in analog data format, which indicates that the image data is in digital data format, the process proceeds from block 606 to block 610. At block 610, the process identifies whether the digital image data needs to be translated into a DMF recognizable digital data format. If the digital data format of the image data is recognizable, the process proceeds from block 610 to block 614.

If the image data is a foreign data format, the process moves from block 610 to block 612, where a translation is performed. At block 612, the foreign data format of input image data is translated into a DMF native data format. In one embodiment, the DMF may have several native data formats, which will reduce the frequency of translation. In another embodiment, the DMF is capable of identifying multiple foreign data formats. After translation, the process proceeds from block 612 to block 614, where the image data is stored.

In one embodiment, the image data is stored in a non-volatile memory device, such as a flash memory, for preventing data loss upon disconnection of power supply. In another embodiment, portable battery power supply is used to prevent data loss upon disconnection of power supply. In yet another embodiment, the image data is stored in a magnetic storage, such as a magnetic disk storage or a magnetic tape storage, for preventing memory loss. After block 614, the process moves to block 618, where the auxiliary data is attached to each image.

At block 618, the process aligns images and attaches the auxiliary information to each image. In one embodiment, the alignment of images can be sequential according to the order of the memory location that the image data stored. In another embodiment, the alignment of images is predefined. The auxiliary information contains the information of a color assignment, a date and time of the image generated, information of Internet addresses, audio, image orientations, and so on.

After attaching the auxiliary information, the process proceeds from block 618 to block 616, where the image data together with the auxiliary information are stored in a memory buffer. The memory buffer is a small and fast memory device that provides fast memory access for displaying images. In one embodiment, the memory buffer is non-volatile memory device to prevent memory loss upon power disconnection. In another embodiment, the memory buffer is regular random access memory having a backup portable power supply to prevent memory loss. After block 616, the process moves to block 620, where the output from the memory buffer can be selected for displaying.

At block 620, the process further receives signals from block 624 and block 622. The block 624 contains input control signals from the user, while the block 622 contains the image data for the last displayed images. The process at block 624 receives a user input, which may indicate to pause the current image. In another embodiment, the user input is used as one of many combinational logic inputs for selecting the next image.

Upon selecting the image data, the process proceeds from block 620 to block 630, where the image is displayed. When the current image is displayed, the process proceeds from block 630 to block 622, where the current image is stored. In one embodiment, block 622 stores the image data only for one image, which is the last displayed image. In another embodiment, block 622 stores the image data for a set of recently displayed images.

In one embodiment, DMF has a pictorial mode and an information mode. While the pictorial mode of DMF displays a sequence of predefined pictures, the information mode of DMF displays a set of information or data, such as news, financial data, advertising, and the like. A third mode, of a combination of pictorial and informational modes may be formed where the DMF dedicates a portion of the screen to pictorial display while another portion of the screen is apportioned to informational display. It should be noted that other types of display modes may be existed, but they are not important to understand the invention.

As discussed previously, DMF is capable of sending and receiving information over a network, such as the Internet. Various categories of information that are available over the Internet are also available to DMF. Accordingly, DMF, in one embodiment, can display several categories of information when it is in the information mode. For example, such categories can include news, sports, entertainment, financial data, et cetera. However, in order to display multiple categories of information in the information mode, DMF has to be set up or configured to handle multiple sets of information. In one embodiment, the information mode of DMF is configured through a DMF server, as will be described in more detail below.

Figure 7:
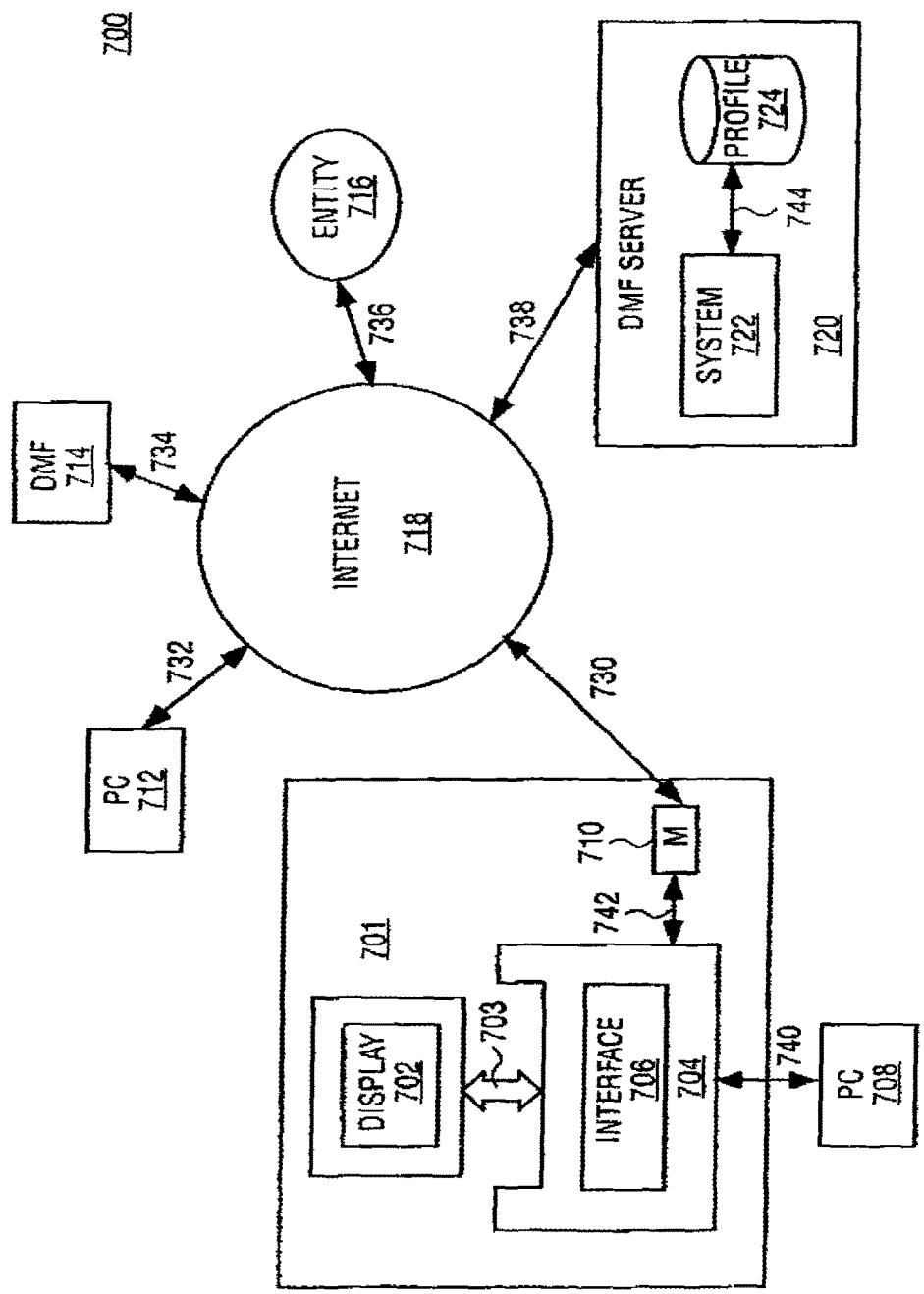
FIG. 7 illustrates one embodiment of a network configuration involving DMF.

FIG. 7 illustrates one embodiment of a network configuration 700. Configuration 700 contains a DMF 701, a PC 712, a PC 708, a DMF 714, an entity 716, a DMF server 720, and the Internet 718. Various conventional connecting cables, such as, cables 730-738, are used to provide device communications through the Internet 718. DMF 701 further contains a display 702, a base 704, and a network-communicating device 710. Display 702 and base 704 are connected using a connecting device 703. In one embodiment, connecting device 703 is a cable. In another embodiment, connecting device 703 is a conventional cordless connecting device. Moreover, base 704 contains an interface circuit 706, which is used to receive and to send information to other devices.

Network-communicating device 710 may be a modem or a cordless modem, such as a cellular modem. In one embodiment, network-communicating device 710 is a one-way transmitting device, such as a pager type of one-way communication device. In another embodiment, network-communicating device 710 is a two-way communicating device, which may facilitate an interactive communication between devices. In one embodiment, DMF 701 uses a cellular modem to communicate with PC 712, DMF 714, and entity 716 or DMF server 720.

PC 712 is, for example, a personal computer and it can communicate with DMF 701 via the Internet 718. DMF 714 is another digital media frame that is capable of communicating directly to DMF 701 via the Internet 718. For instance, DMF 714 may use the Internet 718 as a network vehicle to deliver a set of images to DMF 701. Moreover, entity 716 can be a corporation or a group of devices, which may include multiple DMFs and PCs. In one embodiment, DMF 701 is capable of accessing to any device that is connected to the network.

DMF server 720 is a network server that provides DMF network service for DMF devices connected to the network. In one embodiment, DMF server includes a system 722 and a user profile database 724. DMF network service provides user and data services, which can be used to configure DMF. In one embodiment, the DMF network service supplies a DMF web page, which allows users to configure or receive the DMF network services. In this embodiment, the DMF web page lists multiple categories of images the user can subscribe to. Alternatively, the DMF web page may list multiple commercially available web sites and a user can select listed web sites to view his or her DMF. Commercially available web sites may include, but are not limited to, stock market news, sports, and weather channels. After the user selected the listed categories or web sties, the DMF network service creates a user profile and stores the selected categories or web sites in the user profile. The user profile can later be used as a default configuration for the corresponding DMF.

The DMF network service, in one embodiment, is responsible to maintain the user profile database 724. In this embodiment, the user profile database 724 is resided on DMF server 720. It should be noted that the user profile database 724 could be located on any other network server as long as the DMF network service can access the network serve through the network. The user profile database 724 can be modified either using DMF 710, PC 712, or other devices, which can directly access the DMF server web site. A user can also call a DMF network service provider to verbally convey to a DMF network service representative a new user DMF configuration. More detailed description about accessing the DMF network service will be described later.

Other methods of configuring DMF are possible. For example, DMF 701 could be configured by PC 708 or PC 712. Also, DMF 701 may contain configuration software, which allows DMF 701 to configure itself. It should be noted that other methods for configuring DMF 701 are possible, but they are not necessary to understanding the invention.

Figure 8:
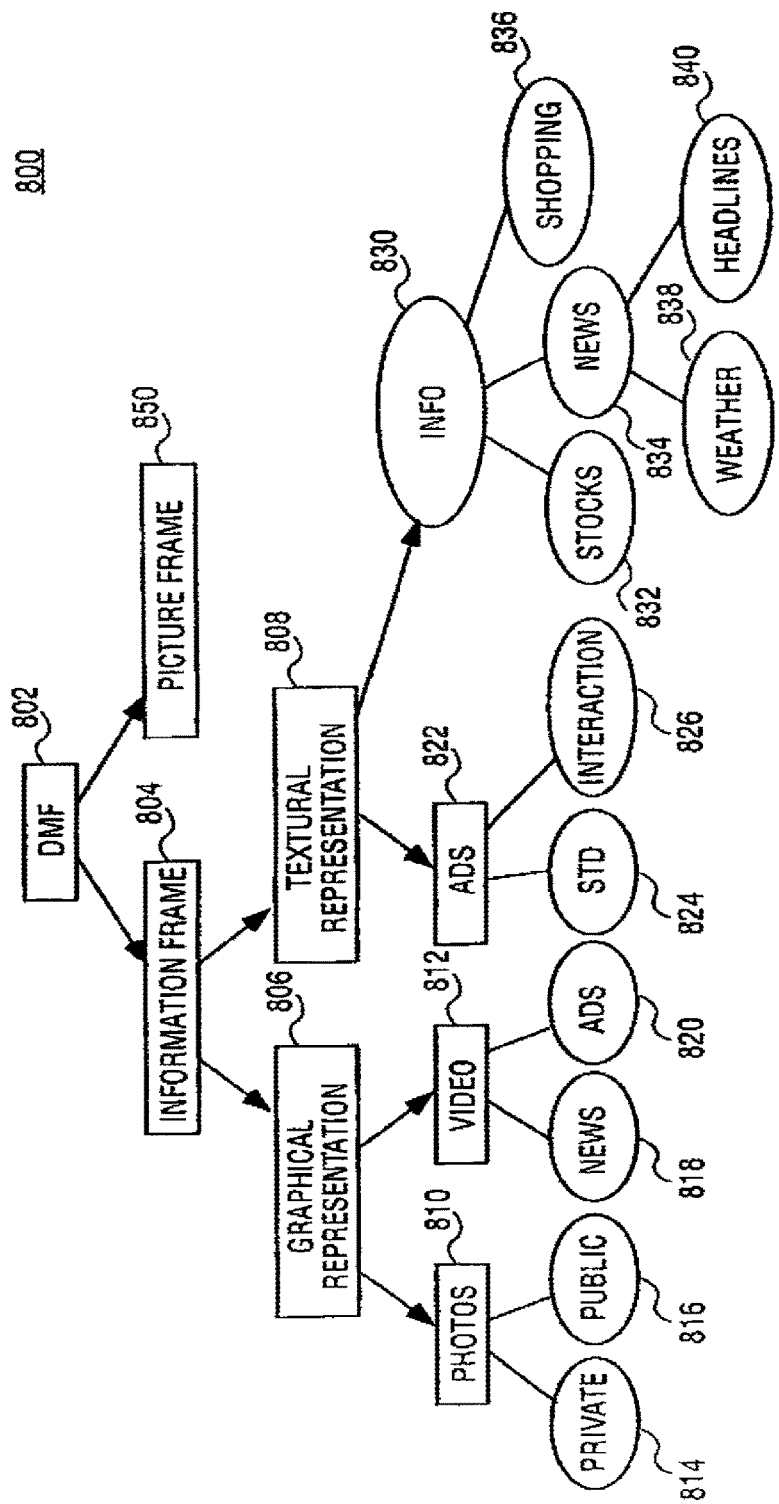
FIG. 8 illustrates an embodiment of architecture of DMF.

FIG. 8 illustrates an embodiment of a DMF architecture 800. DMF 802 includes an information mode 804 and a picture mode 850. Information mode 804 displays informational data, such as stock trading news. Picture mode 850 displays a sequence of pictorial images that are previously received and stored in the memory.

Information mode 804 further contains a graphical representation portion 806 and a textural representation portion 808. Graphical representation portion 806 displays pictorial images while textual representation portion 808 displays text or letters. Graphical representation portion 806 can be further split into photos portion 810 and video portion 812. The photo portion 810 includes still pictorial images and video portion 812 contains motion images. Photo portion 810 can be further divided into private block 814 and public block 816. Private block 814 refers to individual photos, for example, an individual creates a photograph for private use.

Video block 812 can be also divided into a news portion 818 and an advertisement portion 820. News portion 818 refers to a motion picture, such as, a section of videotape from a news reporter. Advertisement portion 820 refers to marketing, which may be an interactive commercial advertisement.

Textural representation portion 808 contains an advertisement portion 822 and an information portion 830. While advertisement portion 822 refers to commercial marketing, information portion 830 denotes useful information, such as weather and stock trading news. Advertisement portion 822 is further divided into a standard section 824 and an interactive section 826. Standard section 824 refers to commercial messages using words and text. Interactive section 826 refers to commercial messages using text interactively, such as an on-line gambling.

Information portion 830 further contains a stock section 832, a news section 834, and a shopping section 836. In one embodiment, stock section 832 refers to stock trading news using text and shopping section 836 refers to on-line shopping using textural representations. News section 834 can be further split into weather channel 838 and news summary channel or headline news 840. Weather channel 838 refers to weather report using text while news summary channel 840 summarizes news. It should be appreciated that any portion of information frame 804 and picture frame 850 can be overlaid to produce a frame that appears as a combination of information and pictures. It should be noted that other categories or portions are possible, but they are not necessary to understanding the present invention.

Figure 9:
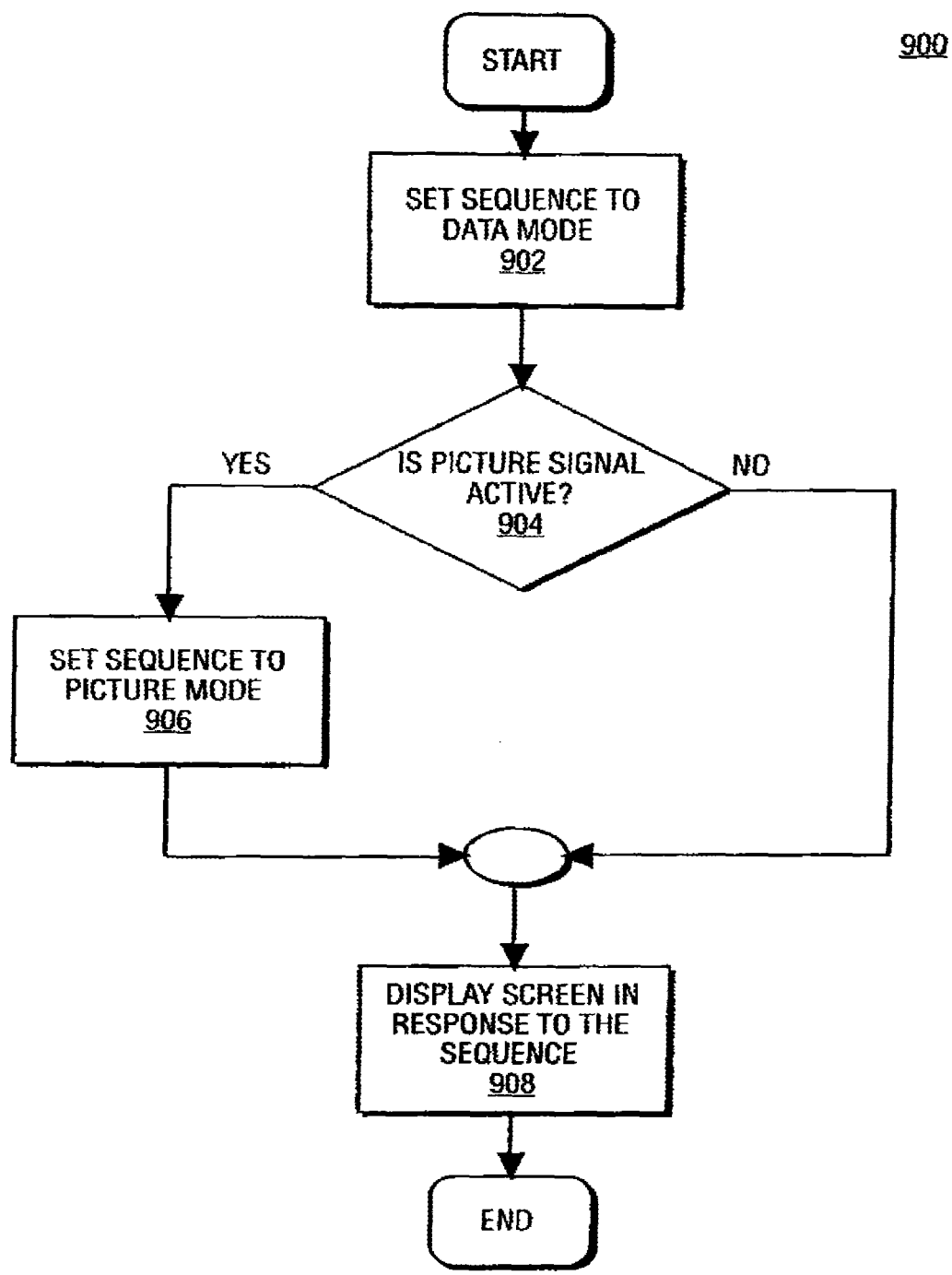
FIG. 9 is a flowchart illustrating an embodiment of multiple modes for displaying images.

FIG. 9 is a flowchart 900 illustrating an embodiment of multiple modes for displaying images. Block 902 shows a step of setting the display sequence to data mode. At block 904, the process determines whether the picture signal is active. If the picture signal is active, which indicates that the picture mode should be set, the picture mode is set at block 906. At block 908, the process displays images according to the display modes. After block 908, the process ends.

Figure 10:
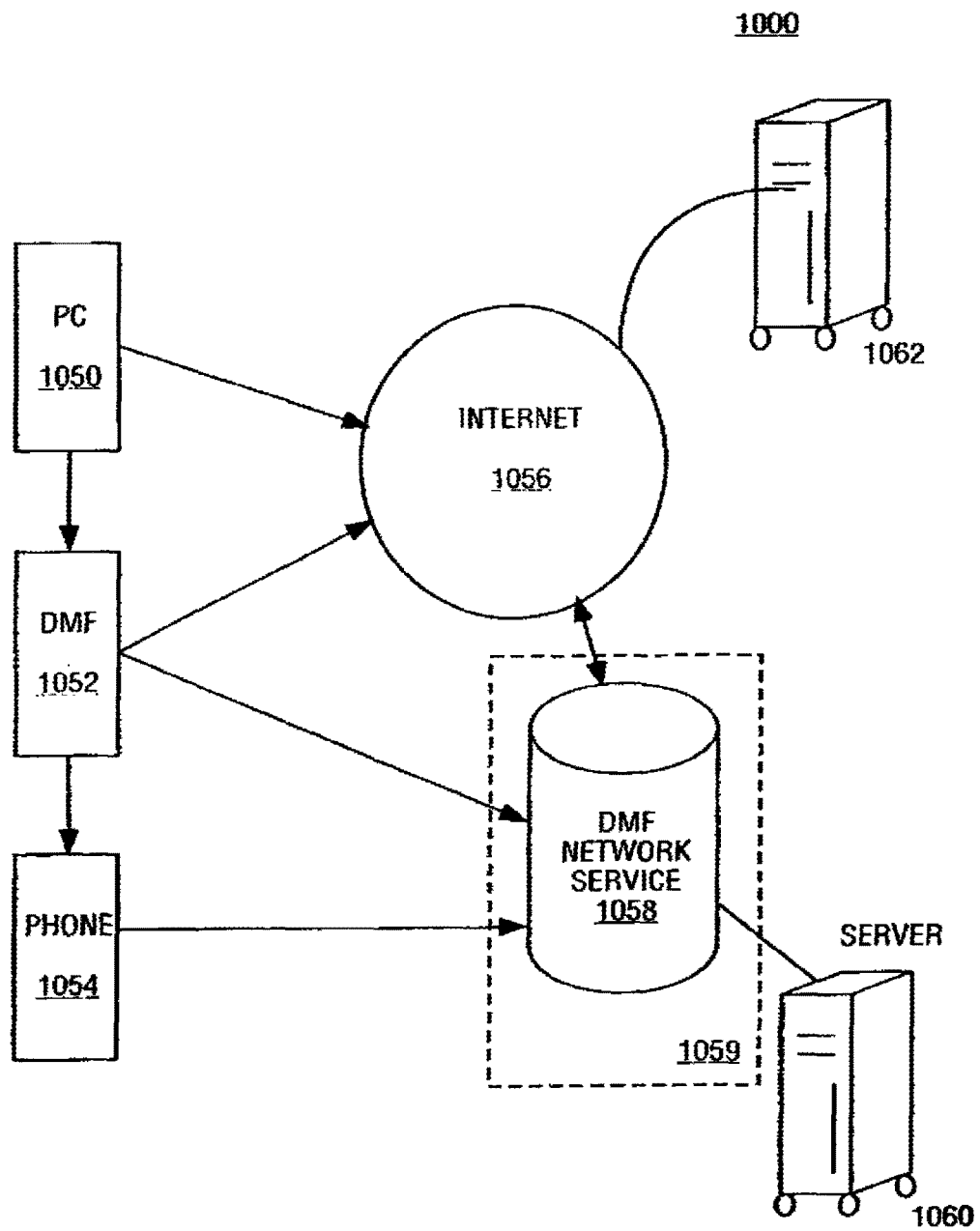
FIG. 10 illustrates an embodiment of multiple mechanisms of accessing DMF network service.

FIG. 10 illustrates an embodiment of a mechanism 1000 showing multiple schemes to access the DMF network service. Mechanism 1000 includes a PC 1050, a DMF 1052, a telephone 1054, a server 1062, and a DMF network server ("DNS") 1059 and all devices are interconnected via the Internet 1056. DNS 1059 supports DMF network service 1058, which provides data implementation. In one embodiment, DMF network service 1058 contains a user profile database, which may be physically located at DNS 1059, server 1050, or server 1062. To access user profiles, a user may use a PC, 1050, a DMF 1052 or a telephone 1054 to access the user profile through DMF network service 1058.

In one embodiment, a user may use the telephone 1054 to initiate DMF network service 1058. Once DMF network service 1058 is initiated, it allows the user to use the services, such as reconfiguration of DMF. For example, when DMF 1052 needs to be reconfigured, DMF network services 1058 supplies a DMF web page and allows a user to select options from the DMF web page to configure DMF 1052. It should be noted that communication between DMF 1052 and DMF network service 1058 is carried out through the Internet 1056.

In another embodiment, a request for DMF network service 1058 from DMF 1052 can be initiated via a direct connection. A direct connection is a cable or a modem that is directly connected between DNS 1059 and DMF 1052. The Internet 1056 can be an alternative connection between DNS 1059 and DMF 1052.

PC 1050 can also be used to request DMF network service 1058 for DMF 1052. In one embodiment, DMF network service 1058 provides services directly to DMF 1052 after it receives the request. In another embodiment, DMF network service 1058 provides services to DMF 1052 through PC 1050. It should be noted that other methods of requesting DMF network service 1058 are possible, but they are not necessary to understanding the present invention.

Figure 11:
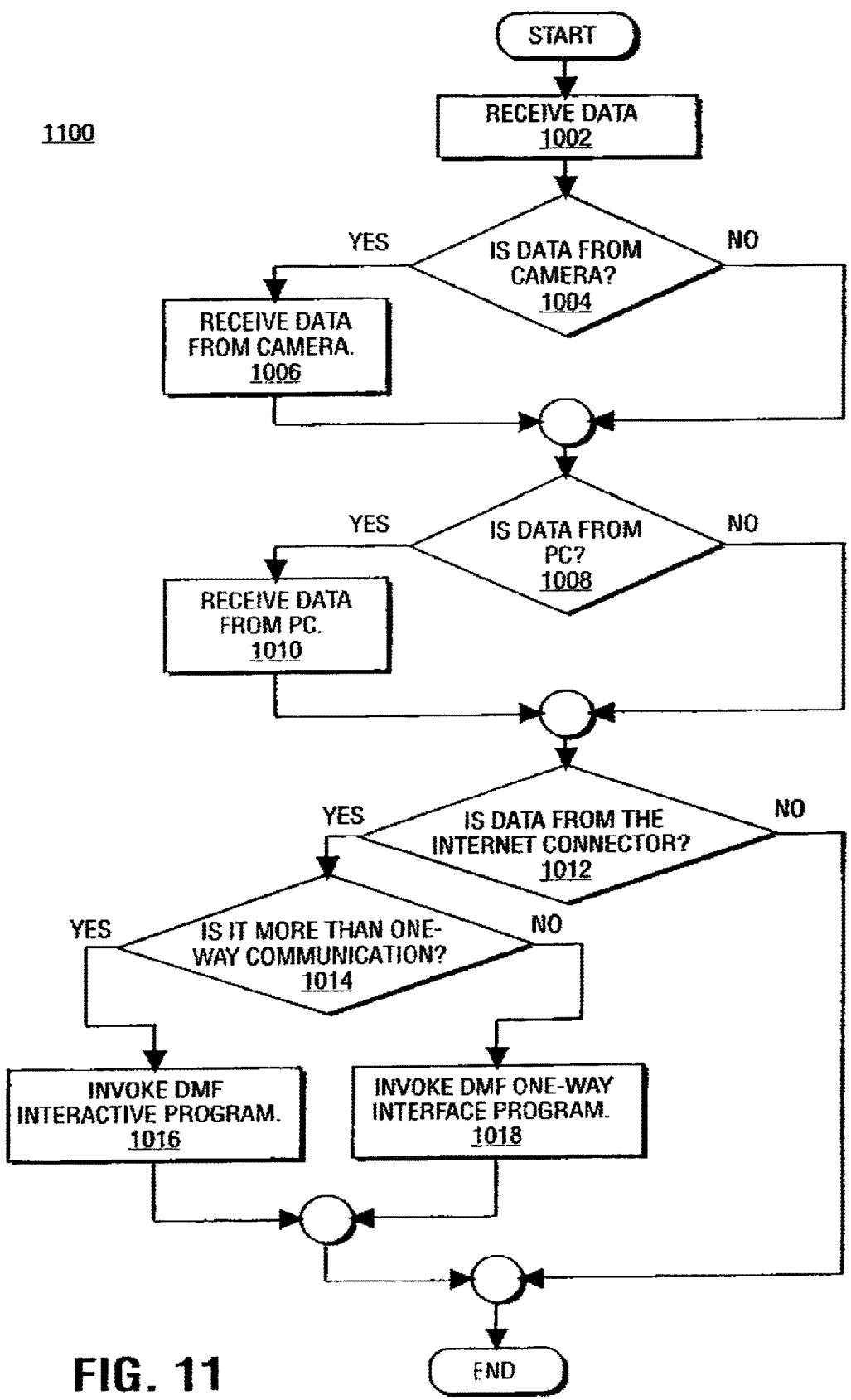
FIG. 11 is a flowchart illustrating an embodiment of receiving data from various devices.

FIG. 11 is a flowchart 1100 illustrating an embodiment of receiving data from various devices. The process begins at the start block and proceeds to block 1002 where the process receives data. At block 1004, the process examines whether the data comes from a camera. If block 1004 is false, the process proceeds to block 1008. However, if the block 1004 is true, which indicates that the data comes from the camera, the process receives the data using camera interface program at block 1006. Camera interface program includes, but not limited to, identifying types of protocol used to transmit the code from the camera and translating the code to native language if it is needed.

At block 1008, the process examines whether the data comes from a PC. If block 1008 is false, the process moves to the block 1002. On the other hand, if block 1008 is true, which indicates that the data comes from the PC, the process moves from block 1008 to block 1010 where the data is received. At block 1012, the process examines whether the data comes from Internet connector. If block 1012 is false, the process loops to the end block where the process ends.

However, if block 1012 is true, which indicates that the data comes from Internet connector, the process proceeds to block 1014 where the process examines whether the communication is a two-way communication. If it is a two-way communication, an interactive communication is possible. If block 1014 is false, which indicates that the communication is a one-way, the process moves to block 1018 where the DMF one-way procedure is invoked to receive the data. For example, a pager type of communication scheme is a typically type of one-way communication device and interactive communication is not permitted. After block 1018, the process moves to the end block where the process ends.

On the other hand, if block 1014 is true, which indicates that the communication is a two-way or more than one-way communication, the process moves to block 1016 where the process invokes the DMF two-way interactive program to handle the data. After block 1016, the process moves to the end block where the process ends.

Figure 12:
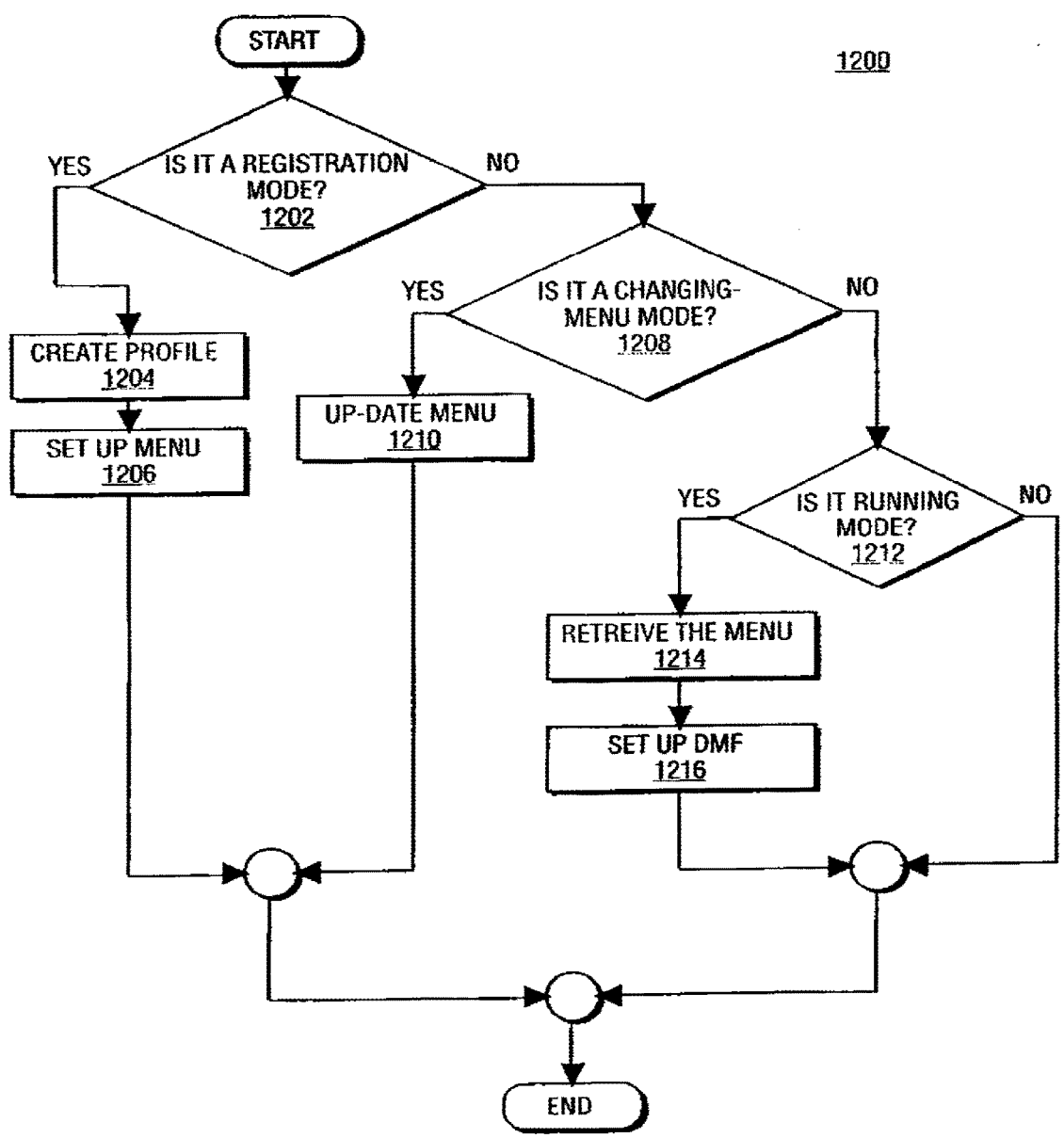
FIG. 12 is a flowchart illustrating an embodiment of different modes for a DMF.

FIG. 12 is a flowchart 1200 illustrating an embodiment of different modes for a DMF. Flowchart 1200 illustrates a registration mode, change menu mode, and running mode. The process begins at the start block and proceeds to block 1212 to examine whether it is a registration mode. If block 1212 is true, which indicates that it is a registration mode, the process proceeds from block 1212 to block 1214 where the process creates a user profile. After block 1204, the process moves to block 1206 where the process sets up the menu and stores the menu to the corresponding user profile. After block 1206, the process ends.

If block 1202 is false, which indicates that it is not a registration mode, the process moves from block 1202 to block 1208. At block 1208, the process examines whether it is a change menu mode. DMF contains a menu, which is used to configure DMF when DMF is used to display information under the information mode. If block 1208 is true, which indicates that it is a change menu mode, the process proceeds to block 1210 where the menu is updated.

If block 1208 is false, the process proceeds to block 1212 and examines whether it is a running mode. During the running mode, DMF fetches the menu from a corresponding user profile and configures the display screen according to the menu. If block 1212 is true, it indicates that it is a running mode, the process proceeds to block 1214. At block 1214, the process retrieves the menu from a corresponding user profile. At block 1216, the information mode of DMF is set up according to the menu. After block 1216, the process ends. If block 1212 is false, the process moves to the end block where the process ends. It should be noted that the flowchart 1200 may contain more than three modes.

Figure 13:
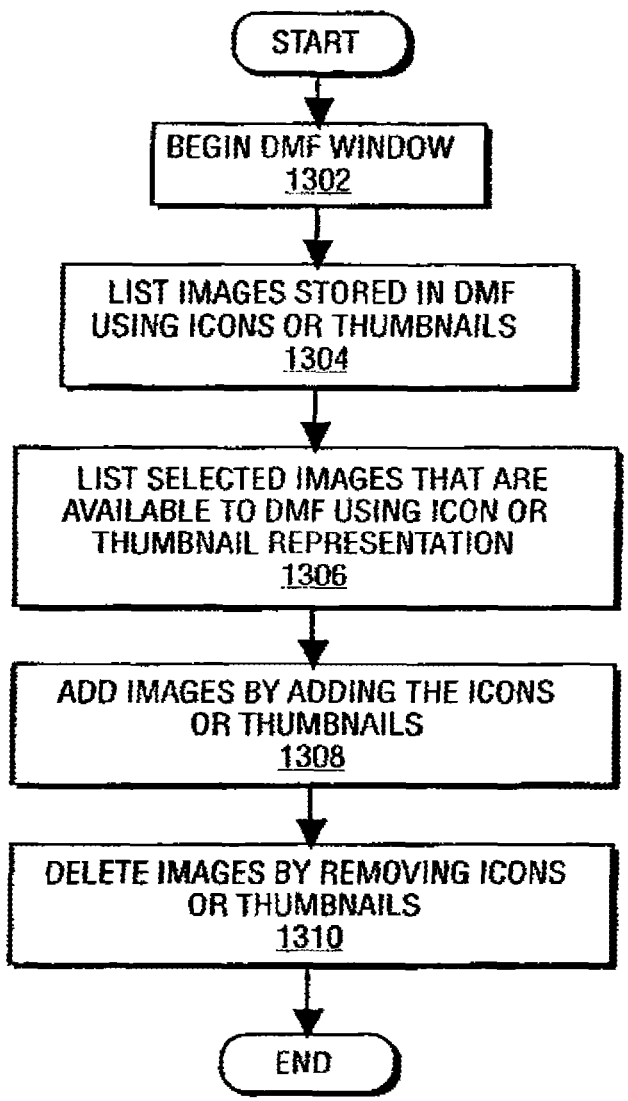
FIG. 13 is a flowchart illustrating an embodiment of DMF window for implementing image data.

FIG. 13 is a flowchart 1300 illustrating an embodiment of DMF window for data implementation. In one embodiment, DMF network service 1058 employs DMF Window to manage the user profile database. The process starts at the start block and proceeds to block 1302. At block 1302, the process begins DMF window. At block 1304, DMF window allocates a portion of screen identified as DMF storage and uses icons or thumbnails to list image files stored in DMF under the DMF storage. Thumbnail is a miniaturized picture that represents the image. At block 1306, DMF window further allocates a second portion of screen identified as global storage where various image files are listed using icons or thumbnails. In one embodiment, image files listed under the global storage are available to DMF.

At block 1308, DMF window allows a user to add an image to DMF by moving the corresponding icon or thumbnail from the global storage (one portion of screen) to the DMF storage (another portion of screen). For example, a user can click an icon and drag the icon from the portion of screen identified as the global storage to the portion of screen identified as the DMF storage. At block 1310, DMF window allows a user to delete an image from DMF by removing the corresponding icon or thumbnail from the DMF storage. For example, a user can click a thumbnail that represents the image to be deleted and drag the thumbnail to the trashcan.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. A system comprising:
a computer configured to store photographic images and text images, wherein the computer includes programmed instructions configured to process the photographic images and text images; and
a portable device including a touchscreen display, a processing unit, and an communication module communicatively coupled to the computer,
wherein the touchscreen display is configured to display images and receive user inputs, wherein the images comprise at least one of photographic images and text images, and
wherein the processing unit is configured to receive user inputs to select an operating mode and customized data, wherein the selected operating mode is selected from a plurality of operating modes including a picture mode that displays pictorial representations and an information mode that displays information representations.

2. The system of claim 1, wherein based on the user selected operating mode, the processing unit is configured to automatically display the selected customized information on the touchscreen display when the digital media frame is in an operating state.

3. The system of claim 1, wherein the plurality of operating modes further includes a registration mode, a change menu mode, and a running mode.

4. The system of claim 1, wherein the computer is further configured to translate a data format of pictorial representations and information representations.

5. The system of claim 4, wherein the pictorial representations and information representations are stored after translation to the data format.

6. The system of claim 4, wherein the pictorial representations and information representations are communicated to the portable device after translation to the data format.

7. The system of claim 1, wherein the plurality of operating modes includes a combination mode of the picture mode and the information mode in which a first portion of the touchscreen display is dedicated to pictorial display and a second portion of the touchscreen display is dedicated to informational display.

8. The system of claim 1, wherein the touchscreen display is configured to receive a selection made from a plurality of available customized data including informational representations and pictorial representations.

9. A method comprising:
receiving a selection at a touchscreen display, wherein the selection is made from a plurality of available customized data including informational representations and pictorial representations;
receiving a selected operating mode from a plurality of operating modes including a picture mode for displaying pictorial representations and an information mode for displaying informational representations; and
based on the selected operating mode, automatically displaying the selected customized information on the touchscreen display when the digital media frame is in an operating state.

10. The method of claim 9, further comprising receiving and converting voice commands to machine-readable instructions.

11. The method of claim 9, wherein the customized data is selected from available customized data including information representations and pictorial representations and wherein the selected customized data is transmitted over a communication network.

12. The method of claim 11, wherein the communication network comprises a wireless cellular network.

13. The method of claim 11, further comprising translating a data format of pictorial representations and information representations received over the communications network.

14. The method of claim 13, storing pictorial representations and information representations in a storage unit, wherein the pictorial representations and information representations are stored after translation of the data format.

15. A non-transitory computer readable medium having instructions stored thereon, the instructions comprising:
instructions for receiving a selection at a touchscreen display, wherein the selection is made from a plurality of available customized data including informational representations and pictorial representations;
instructions for receiving a selected operating mode from a plurality of operating modes including a picture mode for displaying pictorial representations and an information mode for displaying informational representations; and
instructions for automatically displaying, based on the selected operating mode, the selected customized information on the touchscreen display when the digital media frame is in an operating state.

16. The computer readable medium of claim 15, further comprising instructions for receiving and converting voice commands to machine-readable instructions.

17. The computer readable medium of claim 15, wherein the customized data is selected from available customized data including information representations and pictorial representations and wherein the selected customized data is transmitted over a communication network.

18. The computer readable medium of claim 17, wherein the communication network comprises a wireless cellular network.

19. The computer readable medium of claim 15, further comprising instructions for translating a data format of pictorial representations and information representations received over the communications network.

20. The computer readable medium of claim 19, further comprising a storage module configured to store pictorial representations and information representations, wherein the pictorial representations and information representations are stored after translation of the data format.

* * * * *